(12) United States Patent
David

(10) Patent No.: US 6,259,042 B1
(45) Date of Patent: Jul. 10, 2001

(54) WEIGHT DETERMINING SYSTEM

(75) Inventor: Raymond J. David, Dearborn Heights, MI (US)

(73) Assignee: TRW Inc., Lyndhurst, OH (US)

(*) Notice: Subject to any disclaimer, the term of this patent is extended or adjusted under 35 U.S.C. 154(b) by 0 days.

(21) Appl. No.: 09/578,124

(22) Filed: May 24, 2000

(51) Int. Cl.$^7$ .................. G01G 19/08; G01G 19/52; B60R 21/32

(52) U.S. Cl. .................. 177/136; 177/144; 180/273; 280/735; 73/862.391; 701/45

(58) Field of Search .................. 177/136, 144, 177/210 R; 73/862.391, 862.41, 862.393; 701/45; 180/273; 280/735

(56) References Cited

U.S. PATENT DOCUMENTS

| | | | |
|---|---|---|---|
| 3,918,545 | 11/1975 | Andres et al. | 297/480 |
| 4,659,108 | 4/1987 | Sack et al. | 280/807 |
| 5,181,739 | * 1/1993 | Bauer et al. | 73/868.391 |
| 5,413,378 | 5/1995 | Steffens, Jr. et al. | 280/735 |
| 5,765,774 | 6/1998 | Maekawa et al. | 242/390.9 |
| 5,865,463 | 2/1999 | Gagnon et al. | 280/735 |
| 5,905,210 | * 5/1999 | O'Boyle et al. | 73/862.331 |
| 5,906,393 | 5/1999 | Mazur et al. | 280/735 |
| 5,960,523 | 10/1999 | Husby et al. | 24/633 |
| 5,965,827 | * 10/1999 | Stanley et al. | 73/863.391 |
| 5,996,421 | * 12/1999 | Husby | 73/862.391 |
| 6,069,325 | 5/2000 | Aoki | 177/136 |
| 6,081,759 | * 6/2000 | Husby et al. | 701/45 |

OTHER PUBLICATIONS

Internet press release from Siemans Automotive entitled "Siemens Safety Experts Thrive on the 'Strain' of Developing the Most Reliable Occupant Sensing Systems", dated Mar. 7, 2000.*

* cited by examiner

Primary Examiner—Randy W. Gibson
(74) Attorney, Agent, or Firm—Tarolli, Sundheim, Covell, Tummino & Szabo L.L.P.

(57) ABSTRACT

A system and an associated method for determining the weight of an occupant (14) on an associated seat (16) are disclosed. The system includes a sensor (36) for sensing downward force on the seat (16) and a sensor (38) for sensing tension in an associated seat belt (34). A controller (28) is included for determining the weight of the occupant (14) as a function of an output (40) from the sensor (36) and an output (42) from the sensor (38).

4 Claims, 3 Drawing Sheets

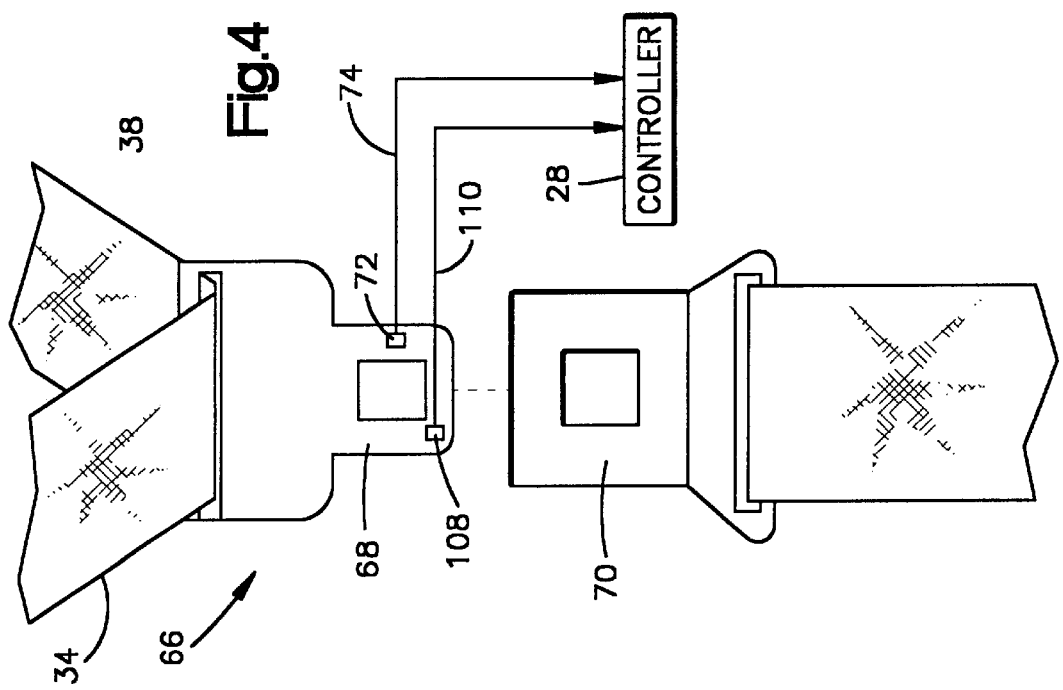
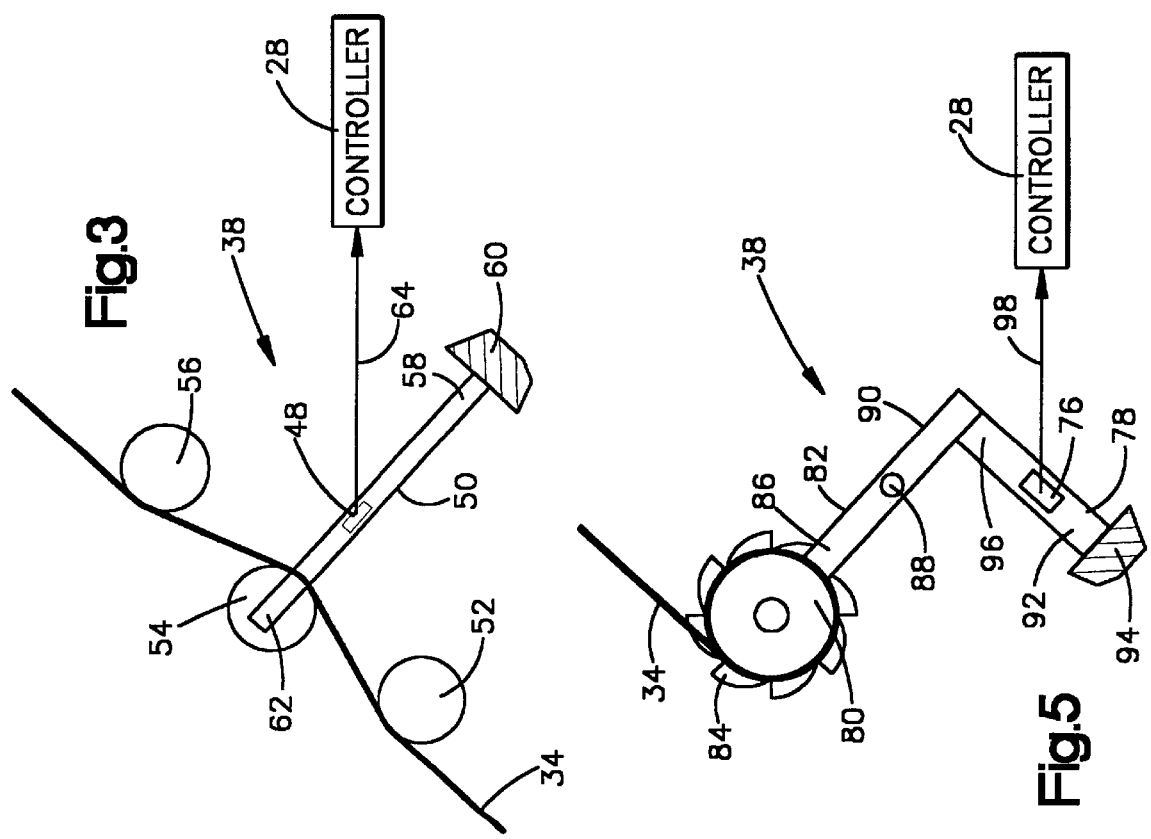

WEIGHT DETERMINING SYSTEM

FIELD OF THE INVENTION

The present invention relates to a system for determining weight, and more particularly, to a system for determining the weight of an occupant or object on a vehicle seat.

BACKGROUND OF THE INVENTION

A conventional vehicle occupant weight sensing system senses the weight of the occupant and includes a weight sensor placed within the vehicle seat. Typically, the sensor is directly within the vertical load path of an occupant's weight and responds to the weight of the occupant on the seat.

In the art, a weight sensing system is often used in conjunction with a control system for controlling the deployment of an occupant protection device. One example type of an occupant protection device that may be controlled responsive to sensed weight is an inflatable occupant restraint device that includes an air bag. Upon the occurrence of a condition for which an occupant is to be protected, the restraint device is deployed and the air bag is inflated within an occupant compartment.

The art has recognized that it may be desirable to adjust deployment of the restraint device (e.g., modify inflation pressure of the air bag). Such a determination may be based, at least in part, on a condition of the occupant or object on the seat, such as the weight of the occupant or object on the seat. Air bag deployment control has accordingly developed wherein weight is considered as one of the deployment control conditions. Thus, methods and systems have been developed to control the deployment of air bags based, at least in part, on the weight of the occupant as sensed by a weight sensor.

For example, U.S. Pat. No. 5,413,378 to Steffens, Jr. et al., assigned to the assignee of the present invention, discloses a system for controlling an occupant restraint system. The system controls air bag deployment and includes a weight sensor for sensing the weight of the occupant. Deployment of the air bag is a function of the weight sensed by the weight sensor. More particularly, a controller establishes a weight range from the weight sensor. The controller controls air bag deployment by selecting one of a plurality of control zones which are dependant upon the sensed weight range.

Similarly, U.S. Pat. No. 5,906,393 to Mazur et al., also assigned to the assignee of the present invention, discloses an occupant restraint system and an associated control system for controlling the deployment of an air bag based, in part, upon a signal from a weight sensor that senses the weight of an occupant.

A seat belt is also commonly used as a component in a protection system. It is generally well known that a seat belt is used to fasten an occupant or a child seat into a vehicle seat. Depending on how tightly the seat belt is fastened across the occupant or child seat, the seat belt may exert a downward force upon the occupant or child seat. If sufficient, the magnitude of this downward force may be detectable by the weight sensor. As such, this downward force may affect the perceived weight of the occupant or object on the seat as sensed by the weight sensor.

SUMMARY OF THE INVENTION

In accordance with one aspect, the present invention provides a system for determining the weight of an object on an associated vehicle seat. The system includes a sensor for sensing downward force on the associated seat. The system also includes a tension sensor for sensing tension in a seat belt associated with the seat. A controller is included in the system for determining the weight of the object as a function of the sensed force on the seat and the sensed tension in the belt.

According to another aspect of the present invention, the controller subtracts a value functionally related to the sensed tension in the seat belt from a value functionally related to the sensed downward force to determine the weight of the object on the seat.

In accordance with another aspect, the present invention provides a method for determining the weight of an object on an associated vehicle seat. The method includes the steps of sensing downward force on the associated seat, sensing tension in a seat belt associated with the seat, and determining the weight of the object as a function of the sensed force and the sensed tension.

According to another aspect of the present invention, the weight of the object is determined as a function of the sensed force and the sensed tension by subtracting a value functionally related to the sensed tension from a value functionally related to the sensed downward force.

BRIEF DESCRIPTION OF THE DRAWINGS

The foregoing and other features and advantages of the invention will become more apparent to one skilled in the art upon consideration of the following description of the invention and the accompanying drawings wherein:

FIG. 3 is a schematic side view of an embodiment of a tension sensor in accordance with the present invention;

FIG. 4 is a schematic view of another embodiment of a tension sensor in accordance with the present invention;

FIG. 5 is a schematic side view of another embodiment of a tension sensor in accordance with the present invention.

DESCRIPTION OF THE PREFERRED EMBODIMENTS

Figure 1:
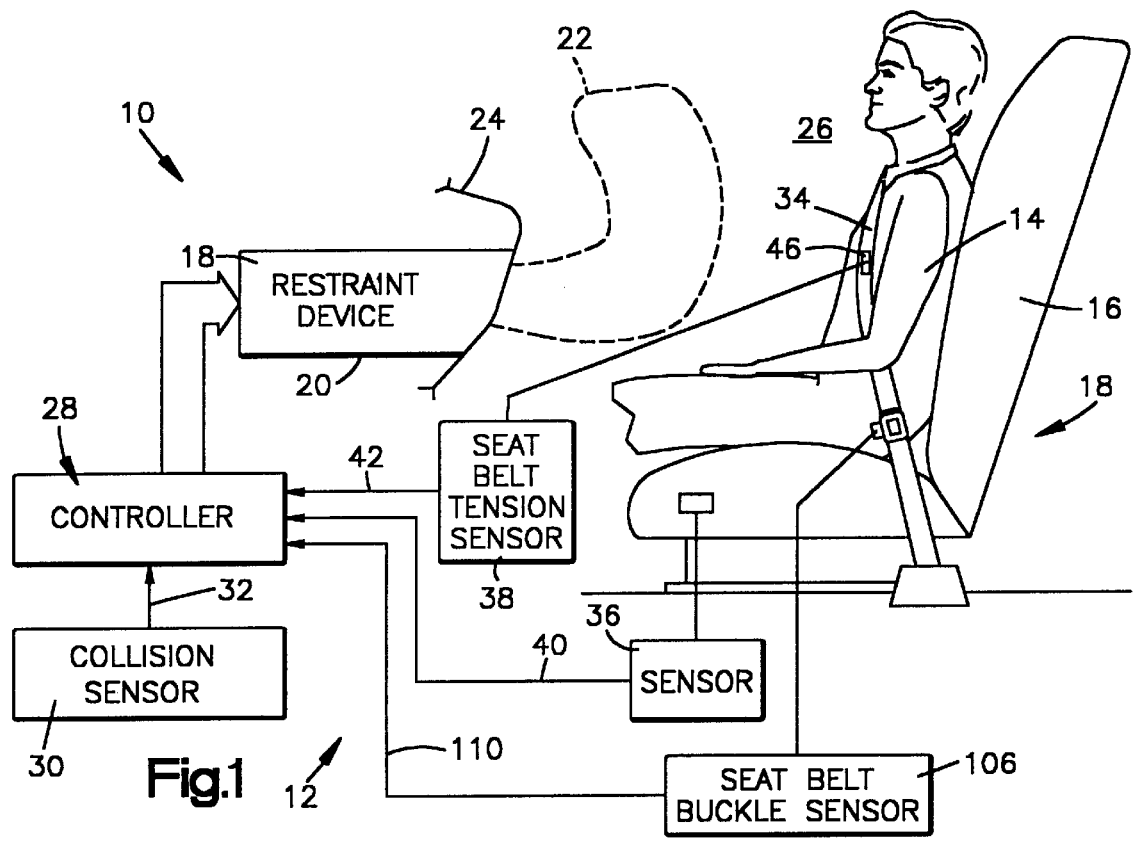
FIG. 1 is a schematic illustration of an occupant restraint system that incorporates a weight determining system in accordance with the present invention.

An occupant restraint system 10 that includes a weight determining system 12 in accordance with the present invention is schematically illustrated in FIG. 1. For demonstrative purposes and ease of understanding, the present invention is discussed in the context of the occupant restraint system 10. However, it is to be appreciated that the present invention is not limited to use with the occupant restraint system 10.

The restraint system 10 is provided for an occupant 14 seated on a vehicle seat 16 within a vehicle 18. The system 10 includes an actuatable occupant restraint device 20. In the example shown, the restraint device 20 includes an inflatable restraint 22, commonly referred to as an air bag. Prior to deployment, the air bag 22 is stored in a folded condition in a vehicle dashboard or instrument panel 24. The air bag 22 is inflatable within an occupant compartment 26 of the vehicle 18 (shown by dashed line 22). The air bag 22 is inflated with inflation fluid from a source of inflation (not shown).

It is to be appreciated by a person of ordinary skill in the art that the restraint device 20 may be another type of actuatable protection device (e.g., a driver's side restraint module, not shown) and may be located elsewhere with the vehicle (e.g., on the steering wheel, also not shown). It is to be further appreciated that the system 10 may include a plurality of restraint devices and that the system may include actuatable restraint devices other than inflatable devices, such as seat belt systems and pretensioners and/or knee bolsters.

In the example shown, deployment of the air bag 22 is controlled by a controller 28. The controller 28 receives sensory input from any number of sources and, using the sensory input, makes determinations for controlling the deployment of the air bag 22. These determinations are provided to the restraint device in the form of control signals to control the deployment of the air bag 22. The controller 28 has any suitable construction. For instance, the controller 28 may be part of and/or include a computer, microcomputer, microprocessor, plurality of discrete components and/or integrated circuits.

An example of a source of sensory input is sensor 30. Sensor 30 is referred to as a collision or crash sensor. It senses a vehicle crash condition for which the occupant 14 is to be protected and provides a signal 32 to the controller 28 indicative of the sensed vehicle condition. In an embodiment of such an example, the collision sensor 30 is an accelerometer and the signal 32 is an electrical signal indicative of the sensed crash acceleration.

It is to be appreciated that the system 10 could have a plurality of such vehicle sensors 30, which provide a plurality of signals 32 to the controller 28 indicative of sensed vehicle conditions. Other sensed vehicle conditions may include, for example, vehicle speed, closing speed with an object, closing angle and vehicle rollover.

As mentioned above, the art has recognized that the sensed weight of the occupant may be used as sensory input for controlling deployment of the air bag 22. However, the sensed weight of the occupant 14 can be affected when a seat belt 34 is used by the occupant 14. For instance, when a seat belt 34 is fastened across the occupant, the belt can exert a downward force on the occupant 14. This exerted force can affect the sensed or perceived weight of the occupant 14. The weight determining system 12 of the present invention compensates or adjusts the sensed weight of the occupant when the occupant 14 is restrained by a seat belt 34. In particular, the weight determining system 12 of the present invention determines the weight of the occupant 14 in response to sensory input from a sensor 36 that senses the total downward force on the vehicle seat 16 as well as sensory input from a seat belt tension sensor 38 that senses the tension in the seat belt 34 used by the occupant 14.

The sensor 36 provides a signal 40 to the controller 28 indicative of the total downward force sensed by sensor 36. Similarly, the seat belt tension sensor 38 provides a signal 42 to the controller 28 indicative of the sensed tension in the seat belt 34. The controller 28 uses this sensory input to calculate the weight of the occupant by subtracting from the total downward force sensed by sensor 36 a value functionally related to the sensed tension in the seat belt 34.

The tension in the seat belt 34 is used as sensory input to adjust the sensed weight of the occupant because the tension in the seat belt is functionally related to the downward force applied to the occupant 14 by the seat belt 34. In particular, the tension in the seat belt 34 is indicative of how tightly the belt is fastened across the occupant 14. Greater tightness of the belt fastened across the occupant 14 translates into a greater downward force exerted by the belt on the occupant. The increased downward force exerted on the occupant by the belt 34 increases the force or weight value sensed by sensor 36. Accordingly, the sensed tension in the seat belt 34 is used by the weight determining system 12 to calculate the amount by which the sensed weight of the occupant should be reduced to account for the effect of the downward force applied to the occupant 14 by seat belt 34.

Figure 2:
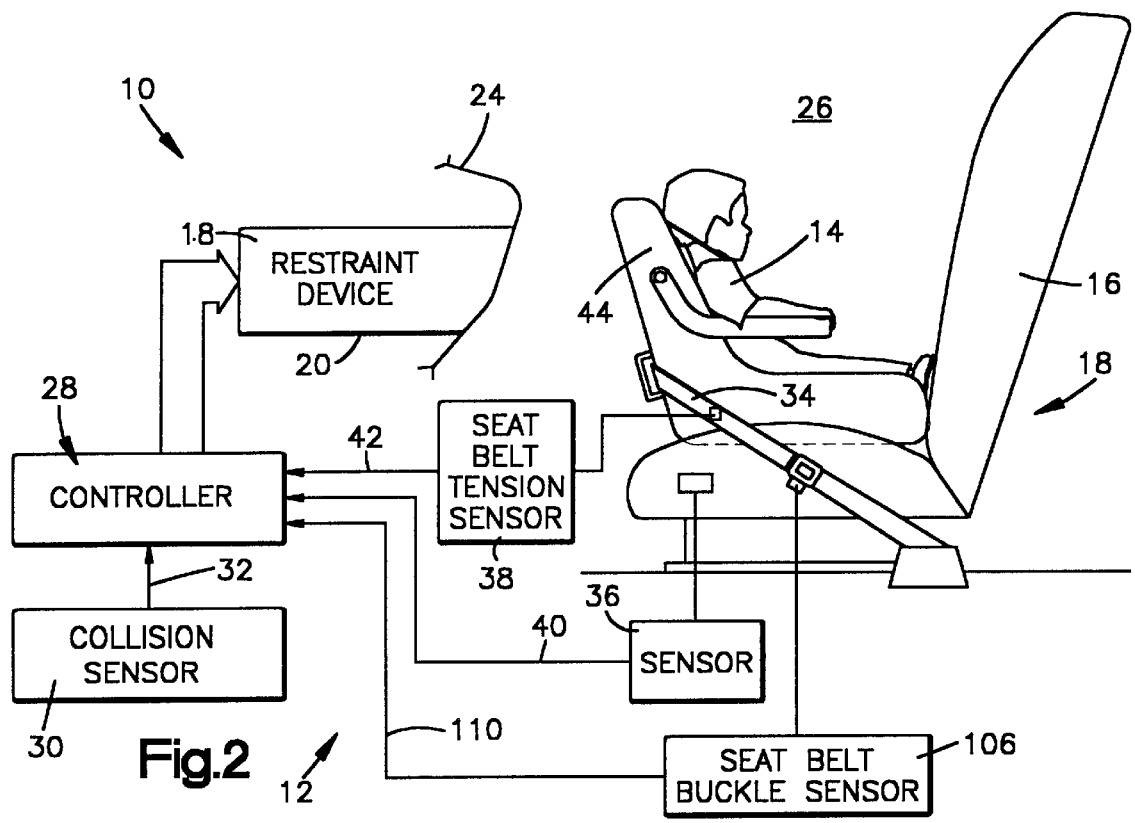
FIG. 2 is an additional schematic illustration of an occupant restraint system that incorporates a weight determining system in accordance with the present invention.

With reference to FIG. 2, the present weight determining system 12 is also useful where the seat belt 34 is used to secure a child seat 44 on the vehicle seat 16. For instance, when the seat belt 34 is used to retain the child seat, it is not uncommon for the seat belt 34 to be cinched very tightly across the child seat 44 so that movement of the child seat 44 on the vehicle seat 16 is limited. In this situation, there is a relatively large amount of tension in the seat belt 34. The controller 28 may be programmed to recognize this relatively large amount of tension as indicative of a child seat 44 on the vehicle seat 16. Alternatively, as with the above described operation of the weight determining system 12, the sensed tension in the seat belt 34 may be used to adjust the sensed weight of the child seat 44 by calculating how much the sensed weight of the child seat is to be reduced to account for the effect of the downward force applied to the child seat 44 by seat belt 34. The controller 28 can thereafter control air bag deployment accordingly, such as suppressing deployment entirely.

An example of a sensor suitable for use as sensor 36 in the present invention includes a strain gauge. The resistivity of a strain gauge varies in proportion to the amount of force applied to it. A strain gauge, therefore, outputs an electrical signal indicative of the total force applied to it. In the weight determining system 12 of the present invention, the strain gauge is located within a bottom portion of the seat 16 and outputs an electrical signal 40 to the controller 28 indicative of the total downward force applied to it.

The tension sensor 38 for sensing the tension in the associated seat belt 34 may take a variety of forms. For example, in the embodiment depicted in FIG. 1, the tension sensor 38 simply comprises a stretch sensor 46 embedded within the weave of the seat belt 34. The resistivity of the stretch sensor changes in proportion to how much the sensor stretches. The stretch sensor, therefore, outputs an electrical signal indicative of the stretch. Because the stretch sensor 46 is embedded within the seat belt 34, the stretch sensor 46 stretches when the seat belt stretches. The seat belt 34 stretches when there is tension within the belt. More particularly, the degree to which the seat belt 34 stretches is proportional to the tension within it. Therefore, because the stretch sensor 46 is embedded within the seat belt 34, the degree to which the stretch sensor 46 stretches is proportional to the tension within the seat belt 34. Accordingly, the stretch sensor 46 outputs an electrical signal 42 to the controller 28 indicative of the tension in the seat belt 34 based upon the degree to which the stretch sensor 46 and the seat belt 34 stretch.

Another illustrative example of a tension sensor 38 in accordance with the present invention is shown in FIG. 3. In this example, the tension sensor 38 is a strain gauge 48 housed within a longitudinal member 50. The longitudinal member 50 is expandable along its length. The resistivity of the strain gauge 48 varies as the member 50 expands and contracts along its length.

In the example shown, the seat belt 34 is threaded through three rollers 52, 54 and 56. One of the rollers 54 is free to move toward or away from the strain gauge 48 in response to tension changes in the seat belt 34. For instance, this roller 54 moves away from the strain gauge 48 when the tension in seat belt 34 increases. This roller 54 moves back toward the strain gauge 48 when the tension in the seat belt 34 is relieved. The other two rollers 52 and 56 are fixed and do not move in response to tension changes in the seat belt 34.

One end 58 of the longitudinal member 50 is rigidly attached to a fixed element 60 so that that end 58 of the member can not move in response to tension changes in the seat belt 34. The fixed element 60 can be any element suitable for the purposes stated herein, such as any rigid portion of the vehicle 18. The other end 62 of the member is attached to the roller 54 which moves in response to tension changes in the seat belt 34. The longitudinal member 50 therefore expands along its length when the tension in the seat belt increases and the roller 54 moves away from the strain gauge 48. The longitudinal member 50 retracts along its length when the tension in the seat belt 34 is relieved and the roller 54 moves back toward the strain gauge 48. Because the strain gauge 48 is housed within longitudinal member 50, the resistivity of the strain gauge 48 varies in response to these movements of longitudinal member 50. The strain gauge thereby outputs an electrical signal 64 to the controller 28 indicative of these movements. Because the movements are the result of tension changes in the seat belt 34, electrical signal 64 is functionally related to the tension in seat belt 34.

Another example of a tension sensor 38 in accordance with the present invention is depicted in FIG. 4. In this embodiment, the tension sensor 38 is located in the buckle portion 66 of the seat belt system. As is generally well known, the buckle portion 66 is used to latch the seat belt 34 in position after it is properly situated across the occupant 14. The buckle portion 73 includes a tongue 68 and a receiving buckle 70 that receives the tongue 68. The tongue 68 is engaged by the receiving buckle 70 when the tongue 68 is fully received within the receiving buckle 70. When the tongue 68 is engaged by the receiving buckle 70, the seat belt 34 is securely latched across the occupant 14.

In this embodiment, a strain sensor 72 is affixed to the surface of the tongue 68. The resistivity of the strain sensor 72 changes in proportion to applied strain (e.g., elongation). The strain sensor 72, therefore, outputs an electrical signal indicative of how much it stretches. Because the strain sensor 72 is affixed to the surface of the tongue, the strain sensor 72 perceives strain pulling force is applied to when the tongue 68. The tongue 68 stretches slightly when there is tension applied to the tongue. The degree to which the tongue 68 stretches is proportional to the applied tension. Therefore, because the strain sensor 72 is affixed to the surface of the tongue 68, the amount of perceived strain is proportional to the tension on the tongue 68. Accordingly, the strain sensor 72 outputs an electrical signal 74 to the controller 28 indicative of the tension on the tongue 68. Because the tongue is part of the seat belt system and is engaged by the receiving buckle 70 when the seat belt 34 is securely latched across the occupant, this signal 74 is functionally related to the tension in the seat belt 34. A slightly different arrangement (not shown) of the foregoing example of tension sensor 38 has the strain sensor 72 located closer to the point where the seat belt 34 is anchored to the vehicle 18 (e.g., below the vehicle seat 16).

Yet another example of a tension sensor 38 in accordance with the present invention is shown in FIG. 5. In this example, the tension sensor 38 is a strain gauge 76 housed within a longitudinal member 78. The longitudinal member 78 is expandable along its length. The resistivity of the strain gauge 76 varies as the member 78 expands along its length.

In the example shown, the seat belt 34 is wound upon a payout roller 80. The seat belt 34 is withdrawn from the roller when the roller 80 is unwound. A linear locking pawl 82 is operatively connected to the payout roller in a manner commonly known in the art so that the amount of seat belt payout can be controlled. For instance, in the example illustrated, the payout roller 80 comprises a plurality of teeth 84 that are selectively engageable by one end 86 of the linear locking pawl 82. When any of the teeth 84 of the payout roller 80 are engaged by end 86 of the locking pawl, the roller 80 can not be unwound and payout of the seat belt 34 is prevented. Alternatively, when none of the teeth 84 of the payout roller 80 are engaged by end 86 of the linear locking pawl 82, roller 80 can be unwound and payout of the seat belt 34 is free to take place.

Seat belt payout occurs in response to tension changes in seat belt 34. Accordingly, when the teeth of the payout roller 80 are engaged with end 86 of the locking pawl and payout is prevented, a torque is exerted on the end 86 of the locking pawl by teeth 84 when there is tension in the seat belt 34. This torque is proportional to the amount of tension in the seat belt 34. For instance, this torque increases when the tension in the seat belt increases and it decreases when the tension in the seat belt decreases.

As shown in FIG. 5, the locking pawl 82 has a pivot point 88 substantially intermediate its length. The linear pawl 82 pivots about this point in response to torque exerted on end 86 by teeth 84. Because the locking pawl 82 pivots about its pivot point 88 in response to torque exerted on end 86, the opposite end 90 of the linear pawl 82 moves in the opposite direction when end 86 is moved by teeth 84. The linear locking pawl therefore cants about pivot point 88 in response to tension changes in the seat belt 34.

With continuing reference to FIG. 5, one end 92 of the longitudinal member 78 which houses the strain gauge 76 is rigidly attached to a fixed element 94 so that that end 92 of the longitudinal member 78 can not move in response to tension changes in the seat belt 34. The fixed element 94 can be any element suitable for the purposes stated herein, such as any rigid portion of the vehicle 18. The other end 96 of the longitudinal member 78 is attached to end 90 of the linear locking pawl 82.

Because the linear pawl 82 cants about pivot point 88 in response to tension changes in the seat belt 34, the end 90 of the linear pawl 82 moves toward or away from the strain gauge 76 in response to tension changes in the seat belt 34. More particularly, when the tension in the seat belt 34 increases, the end 90 of the locking pawl moves away from the strain gauge 76. When the tension in the seat belt 34 is relieved, the end 90 of the locking pawl moves back toward the strain gauge 76. Because the end 96 of the linear longitudinal member is connected to the end 90 of the locking pawl, the longitudinal member 78 expands is along its length in response to tension changes in the seat belt 34. More particularly, the longitudinal member 78 expands along its length when the tension in the seat belt 34 increases. The longitudinal member 78 retracts along its length when the tension in the seat belt 34 is relieved. Due to the fact that the strain gauge 76 is housed within the longitudinal member 78, the resistivity of the strain gauge 76 varies in response to these movements of longitudinal member 78. The strain gauge thereby outputs an electrical signal 98 to the controller 28 indicative of these movements. Because the movements are the result of tension changes in the seat belt 34, electrical signal 98 is functionally related to the tension in seat belt 34.

Figure 6:
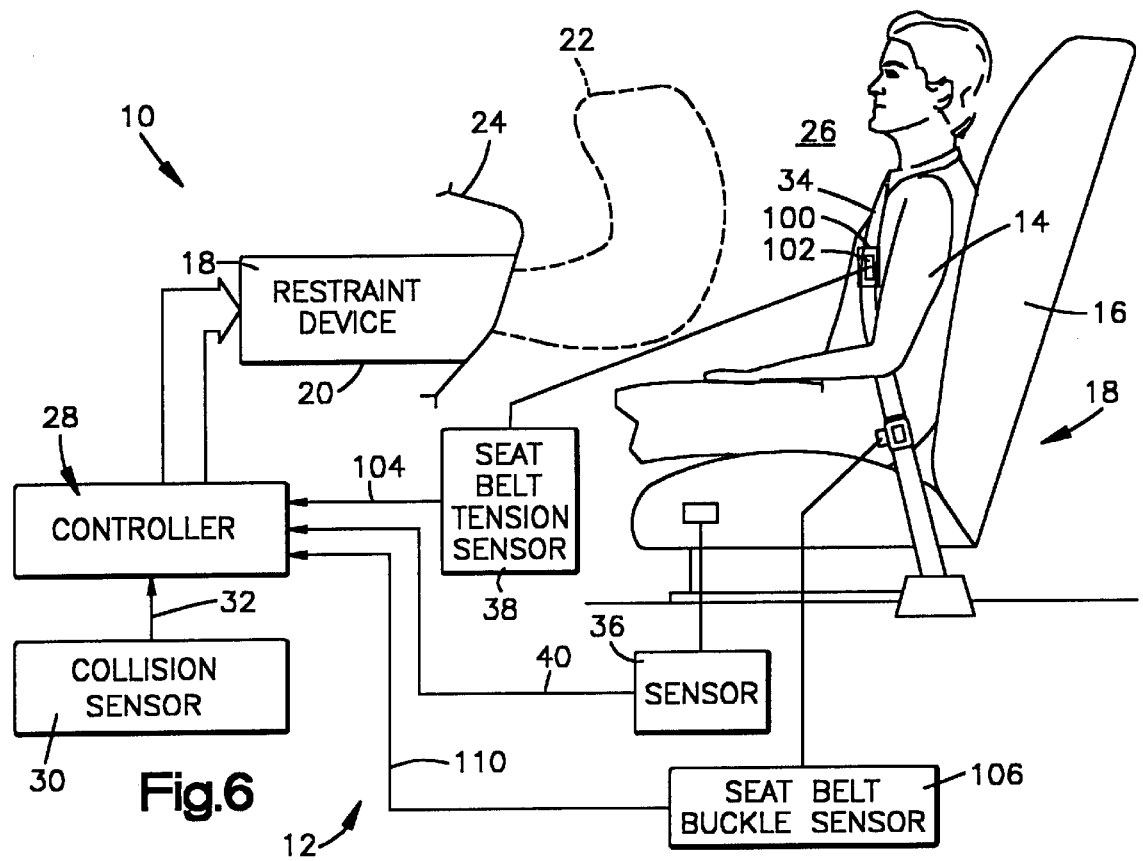
FIG. 6 is a schematic illustration of an occupant restraint system that incorporates a weight determining system in accordance with the present invention and includes an alternative embodiment of a tension sensor in accordance with the present invention.

With reference to FIG. 6, still another embodiment of a tension sensor 38 in accordance with the present invention is disclosed. In this example, a vibration generator 100 is used to generate frequency within the seat belt 34. Because the tension in the seat belt 34 affects the ability of the generator 100 to generate a frequency in the belt 34, the frequency induced in the seat belt is functionally related to the tension in the belt 34. A frequency sensor 102 is used to sense the induced frequency in the seat belt 34 by the generator 100. The sensor 102 outputs a signal 104 to the controller 28 representative of the sensed frequency in the belt 34. In one example, the frequency sensor 102 senses the resonant frequency induced in the seat belt 34 and outputs a signal 104 to the controller 28 indicative thereof. This signal 104 is functionally related to the tension in the seat belt 34. Note that while in FIG. 6, the sensor 102 is illustrated as being located adjacent to the torso of the occupant, the sensor 102 may be located elsewhere. For instance, the sensor 102 may be otherwise located so that it is not in contact with the occupant 14.

With reference to FIGS. 1, 2, 4 and 6, the weight determining system 12 may further include a sensor 106, such as a seat belt buckle sensor 106 that senses whether the occupant 14 is restrained by the seat belt. The seat belt buckle sensor 106 senses whether the seat belt 34 is securely latched across the occupant 14. For instance, it may sense whether the tongue 68 is engaged within the receiving buckle 70 (FIG. 4). In one example, the seat belt buckle sensor 102 includes a switch mechanism 108 which completes a circuit (not shown) when the seat belt is buckled.

Seat belt buckle sensor 106 provides a signal 110 to the controller 28 indicative of whether the seat belt is securely latched across the occupant 14. The controller 28 uses this sensory input to determine whether or not to adjust the sensed weight of the occupant 14 to account for the effect of the downward force applied to the occupant 14 by seat belt 34. For instance, if the signal 110 indicates that the seat belt 34 is not latched across the occupant, then the controller 28 does not adjust the sensed weight of the occupant 14 because the seat belt 34 is not acting upon the occupant 14. However, if the signal 110 indicates that the seat belt is securely latched across the occupant 14, then the controller 28 determines the weight of the occupant accounting for the effect of the downward force applied to the occupant 14 by seat belt 34.

The controller 28 described herein can determine the amount by which the sensed weight of the occupant 14 should be reduced to account for the effect of the downward force applied to the occupant 14 by seat belt 34 in any number of ways. For example, the controller can use preprogrammed formulas to make this determination. Alternatively, the controller 28 can utilize data stored in lookup tables to make this determination.

From the above description of the invention, those skilled in the art will perceive improvements, changes, modifications and different arrangements and locations of the parts and components disclosed herein. Such improvements, changes modifications and different arrangements are intended to be included within the scope of the appended claims. For instance, in the examples shown, for simplicity, ease of understanding and ease of illustration, a single tension sensor is illustrated for sensing the tension in a seat belt having a single segment. However, one skilled in the art can readily appreciate that the present invention is equally applicable to seat belts having more than one segment. For instance, it can be appreciated that in addition to or instead of a seat belt segment that is drawn across the torso of the occupant, the present invention may be used in a segment of a seat belt that is drawn across the lap of the occupant. In the situation where the present invention is applied to more than one seat belt segment, more than one respective stretch sensor may be used to sense the tension within each segment. Moreover, any combination of the sensors described herein may be used in concert. Additionally, the location of the sensors illustrated in the figures is not to be construed as a limitation of the scope of the present invention. For all of the sensors disclosed herein, the location of the sensors shown in the figures is for simplicity, easy of understanding and ease of illustration only. The location of the sensors shown in the figures is not the only operable location of the sensors. The foregoing discussion is in no way intended to limit the scope of the present invention.

Having described the invention, the following is claimed:

1. A system for determining the weight of an object on an associated vehicle seat, said system comprising:

a sensor for sensing downward force on the associated seat;

a tension sensor for sensing tension in a seat belt operatively associated with the seat, said tension sensor including a frequency generator for generating a frequency within the seat belt, and a frequency sensor for sensing the resultant frequency in the belt; and a controller for determining the weight of the object as a function of said sensed force and said sensed tension, wherein said controller subtracts a value functionally related to the sensed tension from a value functionally related to the sensed downward force to determine the weight of the object.

2. A method of determining the weight of an object on an associated vehicle seat comprising the steps of:

sensing downward force on the associated seat;

sensing tension in a seat belt associated with the seat, including reading a strain gauge, which includes generating a frequency within the seat belt, and sensing the resultant frequency in the belt; and determining the weight of the object as a function of the sensed force and the sensed tension, including subtracting a value functionally related to the sensed tension from a value functionally related to the sensed downward force.

3. A system for determining the weight of an object on an associated vehicle seat, said system comprising:

a sensor for sensing downward force on the associated seat;

a tension sensor for sensing tension in a seat belt associated with the seat, said tension sensor comprises a stretch sensor operatively associated with the seat belt; and a controller for determining the weight of the object as a function of said sensed force and said sensed tension, wherein said controller subtracts a value functionally related to the sensed tension from a value functionally related to the sensed downward force to determine the weight of the object.

4. A method of determining the weight of an object on an associated vehicle seat comprising the steps of:

sensing downward force on the associated seat;

sensing tension in a seat belt associated with the seat, including reading a stretch sensor and, determining the weight of the object as a function of the sensed force and the sensed tension, including subtracting a value functionally related to the sensed tension from a value functionally related to the sensed downward force.

* * * * *